US012587550B2

(12) United States Patent
Goldstein et al.

(10) Patent No.: US 12,587,550 B2
(45) Date of Patent: Mar. 24, 2026

(54) DETECTING COMPROMISED CLOUD USERS

(71) Applicant: MICROSOFT TECHNOLOGY LICENSING, LLC, Redmond, WA (US)

(72) Inventors: Eran Goldstein, Herzliya (IL); Idan Hen, Tel-Aviv (IL); Shalom Shay Shavit, Ashkelon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 444 days.

(21) Appl. No.: 17/689,330

(22) Filed: Mar. 8, 2022

(65) Prior Publication Data

US 2023/0216871 A1    Jul. 6, 2023

Related U.S. Application Data

(60) Provisional application No. 63/295,119, filed on Dec. 30, 2021.

(51) Int. Cl.
H04L 9/40 (2022.01)

(52) U.S. Cl.
CPC ...... H04L 63/1425 (2013.01); H04L 63/1441 (2013.01)

(58) Field of Classification Search
None
See application file for complete search history.

(56) References Cited

U.S. PATENT DOCUMENTS

2008/0243876 A1* 10/2008 Godoy ................. G06F 16/288
2009/0327911 A1* 12/2009 Ningune ............. G06F 21/604
                                                                    715/744

(Continued)

FOREIGN PATENT DOCUMENTS

EP          4141586 A1 *  3/2023  ......... G05B 19/0426

OTHER PUBLICATIONS

"International Search Report and Written Opinion Issued in PCT Application No. PCT/US22/052193", Mailed Date: Apr. 11, 2023, 10 Pages.

*Primary Examiner* — Ario Etienne
*Assistant Examiner* — Mohammad Yousuf A. Mian
(74) *Attorney, Agent, or Firm* — David Foster; Newport IP, LLC

(57) ABSTRACT

Compromised user accounts are identified by detecting anomalous cloud activities. Cloud activities are determined to be anomalous by comparing the behavior of a particular user with the previous behavior of that user as well as the previous behavior of other, related users. In some configurations, the related users are organized into one or more hierarchies, such as by geographic location or by a logical structure of a cloud service. The behavior of the related users is modeled at different levels in the hierarchy. Anomaly scores from different groups and levels of the hierarchy are compiled and filtered before being used to determine whether to send a security alert. In some configurations, the security alert indicates that the anomalous operation was detected, why the operation was determined to be anomalous, and in some cases, what harm the operation could lead to if the user is in fact compromised.

18 Claims, 9 Drawing Sheets

(56)        References Cited

U.S. PATENT DOCUMENTS

| | | | |
|---|---|---|---|
| 2015/0319185 A1* | 11/2015 | Kirti | H04L 63/1416 |
| | | | 726/23 |
| 2016/0205081 A1* | 7/2016 | Simons | H04L 63/105 |
| | | | 715/743 |
| 2020/0371510 A1* | 11/2020 | Mappus | G05B 23/0283 |
| 2021/0064431 A1* | 3/2021 | Smith | G06F 9/5077 |
| 2021/0075794 A1 | 3/2021 | Gazit et al. | |
| 2021/0194924 A1 | 6/2021 | Heinemeyer et al. | |
| 2021/0273960 A1 | 9/2021 | Humphrey et al. | |
| 2023/0063214 A1* | 3/2023 | Tischler | G06F 21/6227 |
| 2023/0353588 A1* | 11/2023 | Geethanath | G06F 11/3409 |
| 2025/0103966 A1* | 3/2025 | Beauchesne | G06N 20/00 |

* cited by examiner

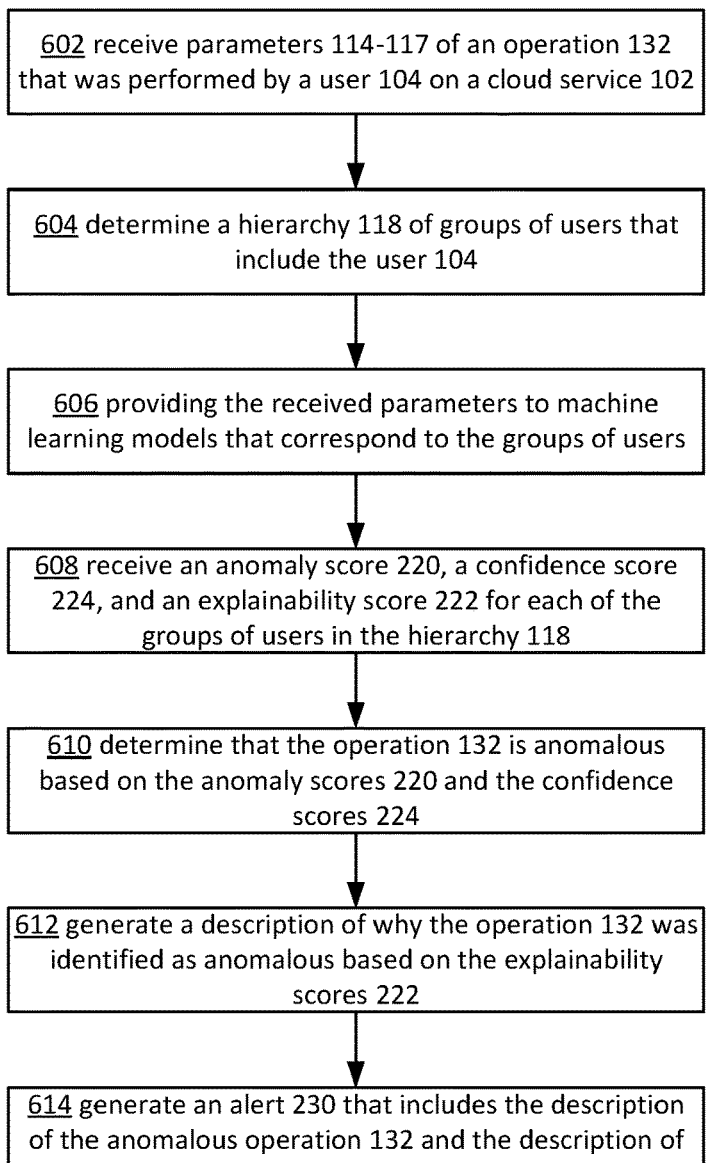

600

602 receive parameters 114-117 of an operation 132 that was performed by a user 104 on a cloud service 102

604 determine a hierarchy 118 of groups of users that include the user 104

606 providing the received parameters to machine learning models that correspond to the groups of users 608 receive an anomaly score 220, a confidence score 224, and an explainability score 222 for each of the groups of users in the hierarchy 118

610 determine that the operation 132 is anomalous based on the anomaly scores 220 and the confidence scores 224

612 generate a description of why the operation 132 was identified as anomalous based on the explainability scores 222

614 generate an alert 230 that includes the description of the anomalous operation 132 and the description of why the operation 132 was identified as anomalous

FIG. 6

DETECTING COMPROMISED CLOUD USERS

PRIORITY APPLICATION

This application claims the benefit of and priority to U.S. Provisional Application No. 63/295,119, filed Dec. 30, 2021, the entire contents of which are incorporated herein by reference.

BACKGROUND

Cloud computing platforms are a common target for hackers. Hackers may compromise a user account by stealing a username and password, exploiting a vulnerability in software that utilizes cloud computing resources, or exploiting a vulnerability in the cloud computing infrastructure itself. Once a hacker has gained access to a user's account, sensitive data may be stolen, data may be surreptitiously altered or destroyed, the user may be impersonated to the detriment of their reputation, computing resources may be misappropriated, security measures may be disabled, etc. As such, there is a continued interest in identifying when a cloud computing user's account has been compromised.

Existing techniques attempt to identify a compromised user account by identifying abnormal user behavior. Behavior is considered abnormal if it is uncommon or unexpected based on a model of the user's previous behavior. For example, an operation that reads a particular piece of data for the first time may be flagged as abnormal for a particular user. However, these models tend to misclassify newly-observed behavior as anomalous, even if it is benign.

If too many false positives are reported, then actual anomalous behavior may be lost within the noise. Furthermore, customers may ignore the results entirely if the burden of distinguishing false positives outweighs the benefits of identifying compromised accounts. It is with respect to these technical issues and others that the present disclosure is made.

SUMMARY

Compromised user accounts are identified by detecting anomalous cloud activities. Cloud activities are determined to be anomalous by comparing the behavior of a particular user with the previous behavior of that user as well as the previous behavior of other, related users. In some configurations, the related users are organized into one or more hierarchies, such as by geographic location or by a logical structure of a cloud service. The behavior of the related users is modeled at different levels in the hierarchy. For example, the behavior of users from the same city may be modeled, as well as the behavior of users from the same country, the same time zone, etc. When analyzing a particular action taken by the particular user, each model generates an anomaly score, a confidence score, and an explainability score. Anomaly scores indicate how anomalous the operation is, confidence scores indicate how sure the model is that the operation is anomalous, and explainability scores indicate why the operation was anomalous. These scores are compiled and filtered before being used to determine whether to send a security alert. In some configurations, the security alert indicates that the anomalous operation was detected, why the operation was determined to be anomalous, and in some cases, what harm the operation could lead to if the user is in fact compromised.

Cloud-based systems consist of various types of resources and users. Each resource and each user has a set of entities they may interact with within a cloud service, as well as a specific set of operations with which to access the entities. For example, a user may be limited to read-only operations when accessing a database. Cloud-based systems employ a resource manager for enforcing these access constraints.

If a hacker were to gain access to a user's cloud portal—e.g. a website through which the user allocates cloud resources—or if the hacker were to compromise a user's account, the hacker may be able to perform impactful operations. However, many impactful operations are commonly performed by users themselves as part of managing and interacting with the cloud service, and therefore it is not trivial to distinguish between malicious and benign use of such operations.

In some configurations, machine learning techniques are used to alert when compromised user accounts are detected. For example, a compromised user account may be detected by identifying anomalous invocations of impactful operations. As referred to herein, an operation is impactful if it is important, such as accessing sensitive data, performing sensitive actions, etc. An operation is determined to be anomalous based on machine learning models of past behavior of the user and machine learning models of past behavior of groups of related users—e.g. hierarchies of related users. Together, the results of these models are used to detect anomalous cloud operations.

In some configurations, user behavior is modeled with a multivariate anomaly detection model trained on various features of cloud operations. Features of cloud operations may include, for example, the day of the week when the operation was performed, the name of the operation that was executed, a user identifier, and a resource identifier. A multivariate model enables a rich, robust and expressive behavioral profile. Operations having an abnormal combination of such features can be a good indication of abnormal activity of the user—an indication that may have been missed if these features were inspected individually.

However, benign activity can appear as "malicious" if the user alters or expands their behavior—e.g., interacting with new resources, applying new types of operations, etc. In order to reduce such false alerts, an assessment is made whether the operation is considered anomalous at different levels in the hierarchy. This approach allows cloud operations to be modeled on several levels of granularity, offering additional perspectives on whether the operation is anomalous. By looking at a "bigger picture", an operation that would be abnormal for a specific user may be considered non-anomalous if one or more levels of the hierarchy consider it not anomalous. In this way, determining that an operation is anomalous may be performed in part by determining that that operation is not non-anomalous.

In some configurations, multiple hierarchies may be evaluated. For example, in addition to a hierarchy based on the geographic locations of users, a hierarchy based on corporate structure or a hierarchy based on how cloud resources are provisioned may also be consulted. Modeling a user's action at different levels of granularity across different hierarchies further improves the accuracy of an anomaly assessment compared to a single model that produces a single anomaly score.

In some configurations, when an anomalous operation is detected, one or more filters are applied to determine whether to generate an alert. A specific operation filter identifies specific operations or types of operations to be ignored. For example, an operation that adds a description to a cloud object may be anomalous, but it will be ignored if it is considered benign by the specific operation filter. Additionally, or alternatively, a minimum score filter may ignore any anomalous operations that do not have a minimum anomaly score, a minimum confidence score, a minimum explainability score, or a combination thereof.

Security alerts may include a description of the anomalous operation. Security alerts may also include an explanation of potential consequences of not addressing the alert and/or other contextual information indicating why the alert was issued. In some configurations, explanations are generated based on explainability scores. Explanations may also be enhanced with domain specific knowledge. For example, security-domain enrichments, such as a list of potential attack types associated with specific impactful operations, may be used to indicate why an identified anomaly is considered dangerous.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 6 is a flow diagram showing aspects of a routine for the disclosed techniques.

DETAILED DESCRIPTION

Figure 1A:
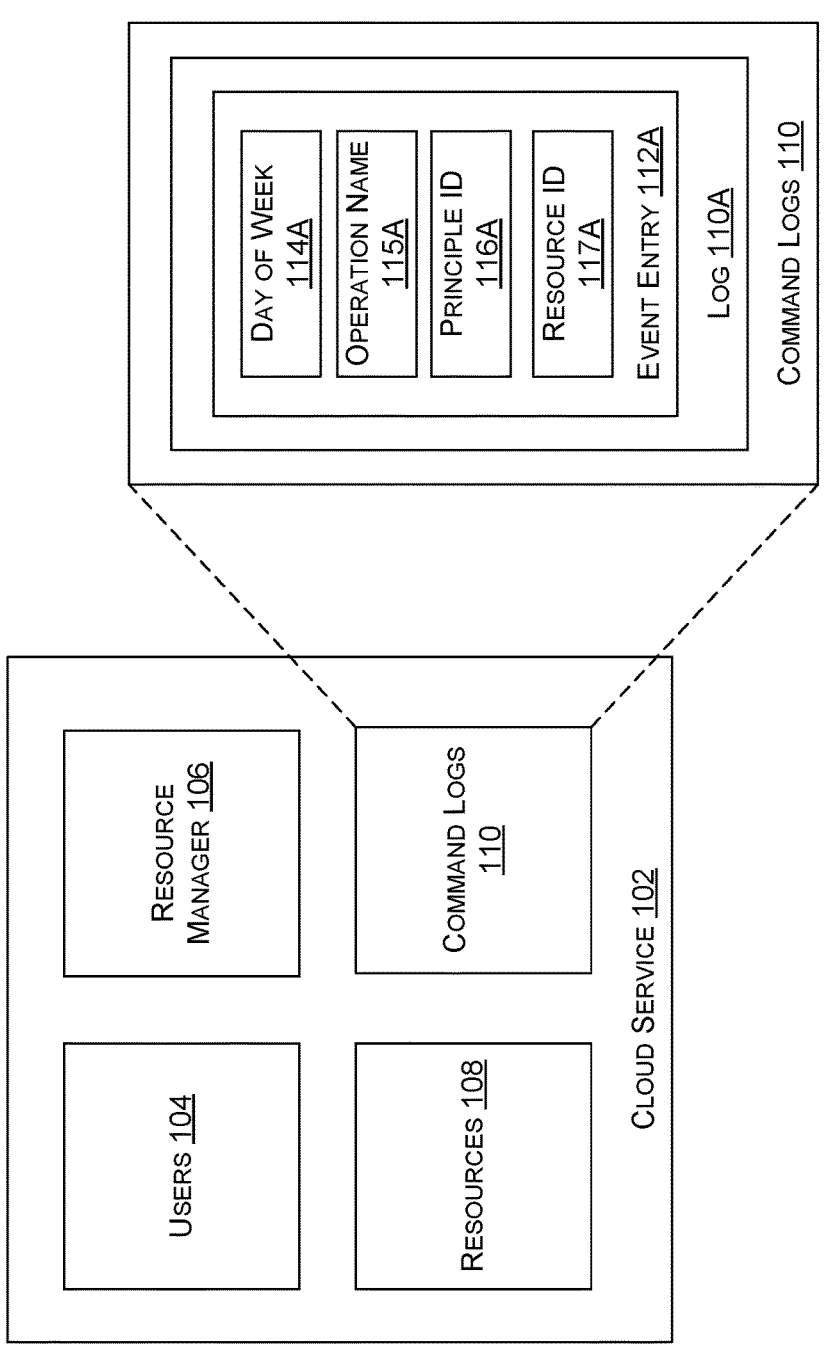
FIG. 1A illustrates a cloud service including command logs that record operations made by users of the cloud service.

FIG. 1A illustrates a cloud service 102 including command logs 110 that store event entries 112 for operations performed by cloud service 102 on behalf of users 104. Cloud service 102 consists of various types of resources 108 and users 104. Resources 108 may refer to any physical or virtual asset hosted by or otherwise provided by cloud service 102, such as virtual machines, table storage, "blob" storage, etc. Users 104 may refer to user accounts associated with people, corporations, schools, or any other organization.

Each of users 104 and resources 108 may be associated with a set of entities—e.g. users, resources, network endpoints, security groups, or any other aspect of cloud service 102—that they are authorized to interact with. Furthermore, users 104 and resources 108 may be authorized to interact with these entities with specific sets of operations. As referred to herein, operations refer to invocations of functionality provided by cloud service 102, such as a file upload operation. Resource manager 106 is the part of cloud service 102 that authenticates and authorizes operations requested by a user 104 to be performed using one of resources 108. One example of cloud service 102 is Microsoft® Azure.

As illustrated, command log 110A includes event entry 112A, which stores parameters that were used to invoke an operation. Event entry 112A includes parameters representing the day of week 114A, operation name 115A, principle identifier 116A, and resource identifier 117A. Day of week 114A indicates which day the operation was invoked on, e.g. Monday, Tuesday, etc. Operation name 115A is the name of the operation that was invoked. Principle identifier 116A identifies the user 104 that is invoking the operation. Resource identifier 117A identifies a resource that is impacted by the operation, e.g. read from, modified, deleted, etc. While a single resource identifier 117A is depicted, it is similarly contemplated that multiple resource identifiers 117 may be associated with particular operations. Command logs may record parameters from successful and unsuccessful invocations of operations.

Figure 1B:
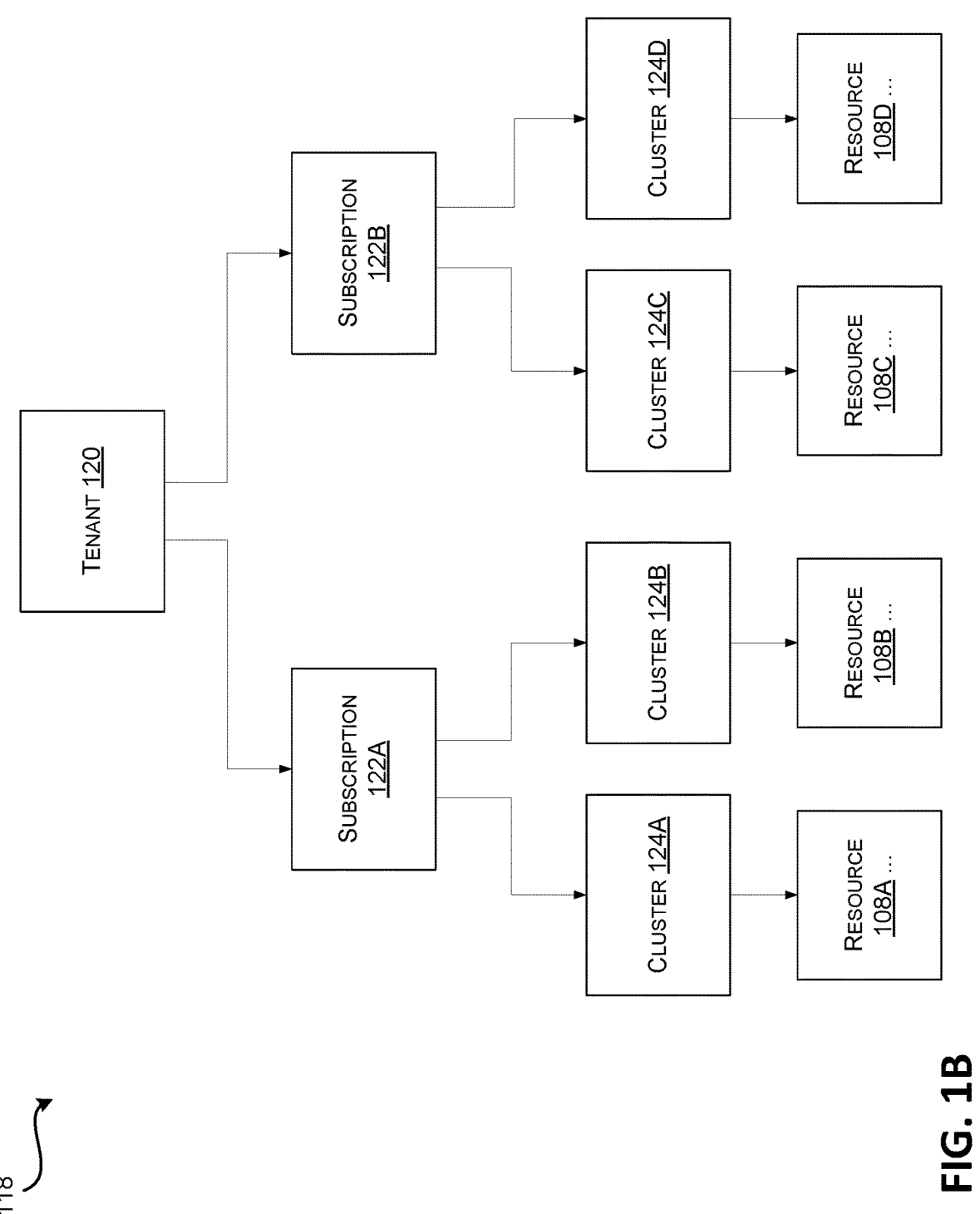
FIG. 1B illustrates a logical hierarchy of users based on a resource allocation scheme of a cloud service.

FIG. 1B illustrates a logical hierarchy 118 of users based on a resource allocation scheme of a cloud service. Cloud service providers often enable customers to define structures within which cloud-based resources are allocated and accessed. The example illustrated in FIG. 1B uses terminology for Microsoft® Azure, but comparable hierarchies from other cloud service providers are similarly contemplated. Hierarchy 118 includes tenant 120, which is the highest level in hierarchy 118. As part of Microsoft® Azure, a tenant refers to all of the computing services and resources associated with a particular directory server—e.g. Azure Active Directory. As illustrated, all users 104 and all resources 108 are part of tenant 120.

Tenant 120 is divided into two subscriptions, 122A and 122B. Subscriptions are logical collections of cloud resources that remain independent of one another. For example, different subscriptions may be created for different divisions within a corporation. Each of subscriptions 122 may be implemented on one or more of clusters 124, which represent collections of computers used to provide resources 108.

Figure 1C:
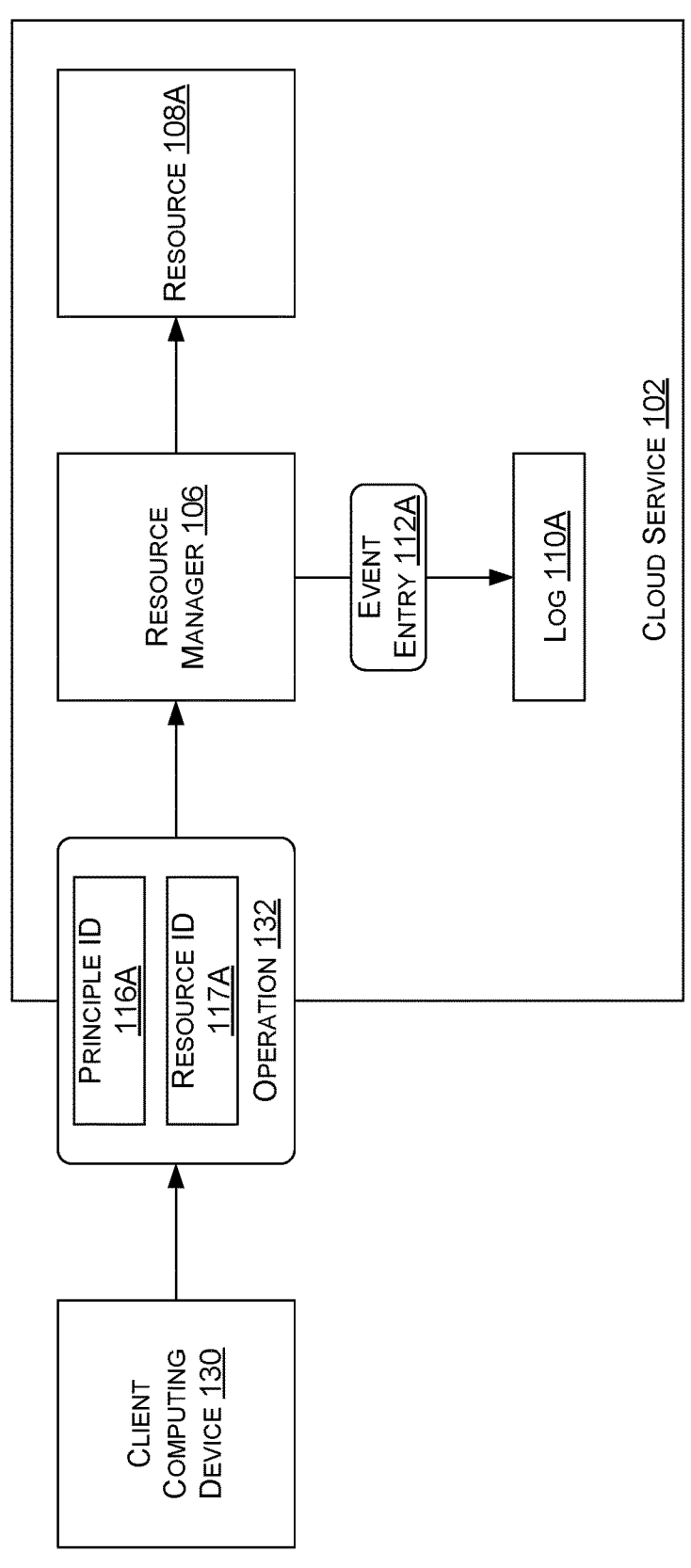
FIG. 1C illustrates an operation being performed by a cloud service.

FIG. 1C illustrates an operation 132 being performed by a cloud service 102. Client computing device 130 submits operation 132 to resource manager 106. Operation 132 includes principle identifier 116A, indicating which user 104 is making the request. Operation 132 also includes resource identifier 117A, indicating which resource 108 will be affected. Operation 132 is provided to resource manager 106, which authorizes or denies the requested operation 132. If the identified user is authenticated and authorized to perform the requested operation 132 on the identified resource 108A, then the operation is allowed to be performed. In either case, event entry 112A is added to log 110A.

Figure 2:
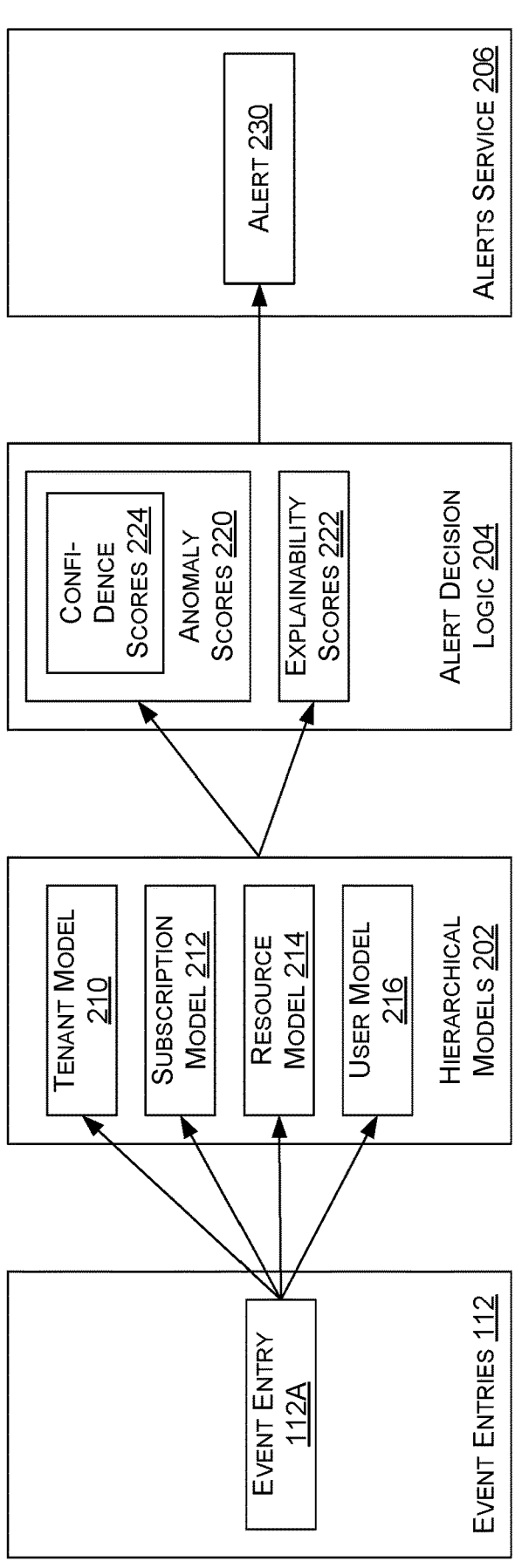
FIG. 2 illustrates generating an alert based on determinations made by models of each level in a hierarchy of users.

FIG. 2 illustrates generating an alert 230 based on determinations made by models of each level in a hierarchy of users. Properties extracted from event entry 112A are provided to tenant model 210, subscription model 212, resource model 214, and user model 216. Each of these models is part of a hierarchy of models 202, where each model is associated with a group of users that includes the user identified by principal identifier 116A.

Each of models 210, 212, 214, and 216 generate anomaly scores 220, each of which includes one of confidence scores 224, and explainability scores 222. As referred to herein, anomaly scores 220 refer to a degree to which operation 132 is anomalous. In some configurations, operations that have historically been performed by the same user will have low anomaly scores, while operations that have rarely if ever been performed by the same user will have high anomaly scores. By analyzing the past behaviors of different but related groups of users, different perspectives on what operations are anomalous may be revealed.

Anomaly scores 220 and explainability scores 222 are provided to alert decision logic 204, which filters and compiles scores from different levels in a hierarchy of groups of users—if not from different hierarchies. Filtering and aggregating anomaly scores and explainability scores is described in more detail below in conjunction with FIG. 5. Once anomaly scores have been filtered, the remaining scores may be used to determine if the operation 132 is anomalous—and if so, the confidence with which the determination is made. Once an operation 132 has been identified as anomalous, alert 230 may be generated to indicate the possibility that operation 132 is from a compromised user account. External knowledge associated with operation 132 may then be retrieved and used to augment alert 230 with text indicating why operation 132 was determined to be anomalous.

Figure 3:
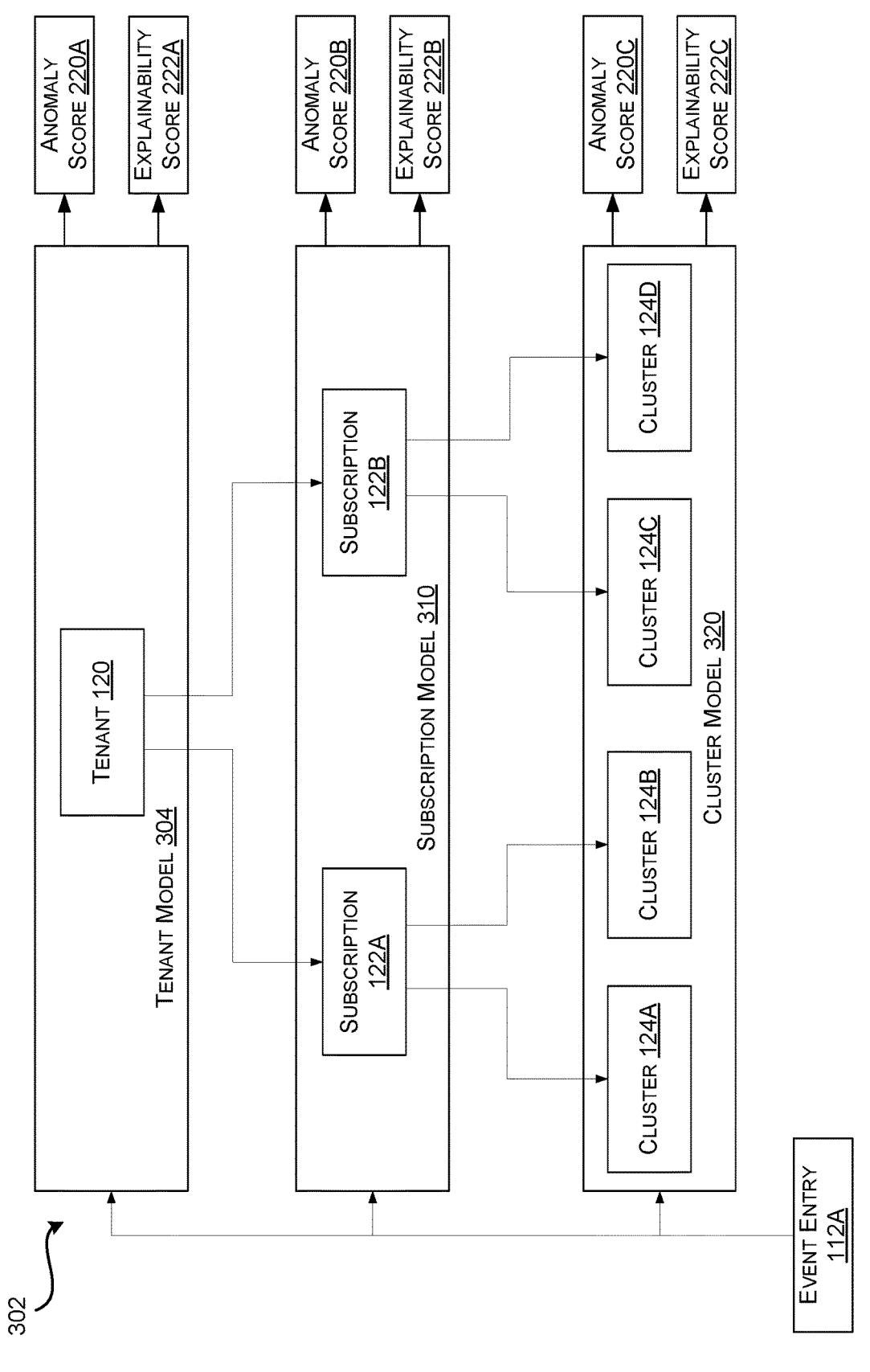
FIG. 3 illustrates a cloud event being processed by models of each level of a logical hierarchy based on cloud resource provisioning.

FIG. 3 illustrates a cloud event entry 112A being processed by models of each level of a logical hierarchy based on cloud resource provisioning subdivisions. As discussed above in conjunction with FIG. 1B, a logical hierarchy of users 104 and resources 108 may be established under tenant 120. As illustrated in FIG. 3, tenant model 304 is trained to generate anomaly score 220A and explainability score 222A based on the operations and other actions taken by users that are part of tenant 120.

Similarly, subscription model 310 is a machine learning model trained to generate anomaly scores 220B and explainability scores 222B for one of subscriptions 122. Specifically, whichever subscription 122 the user identified by principle identifier 116A belongs to is used to infer anomaly score 220B and explainability score 222B.

In the same way, cluster model 320 is a machine learning model trained to generate anomaly scores 220C and explainability scores 222C from the cluster 124 that contains the user 104 or the resource 108 identified by event entry 112A.

In some configurations, if the operation 132 referenced by event entry 112A is determined to be not anomalous—i.e. normal—by any of the levels of hierarchy 302, then the event is determined to be not anomalous, and no alert 230 is raised. However, it is similarly contemplated that only when a majority of levels of the hierarchy indicate the event is not anomalous is the event not considered anomalous. When weighing the results of different machine learning models, different levels in the hierarchy may be weighted differently. In some configurations, a rule-based approach is applied to the outputs of the models 304, 310, and 320 to determine whether event entry 112A is anomalous.

In some configurations, each group of users of hierarchy 302—e.g. tenant 120, subscriptions 122A and 122B, and clusters 124A-D are evaluated individually to determine whether the operation 132 is anomalous or not. In some configurations, if a machine learning model associated with any group at any level of the hierarchy 302 indicates that the operation is non-anomalous, then the operation will be interpreted as non-anomalous. In other scenarios, only if a threshold number or percentage of machine learning models associated with groups of users indicate that the operation is non-anomalous will the operation be identified as non-anomalous. In some configurations, a group-based analysis of the operation is combined with a hierarchical level-based analysis of the operation.

Figure 4:
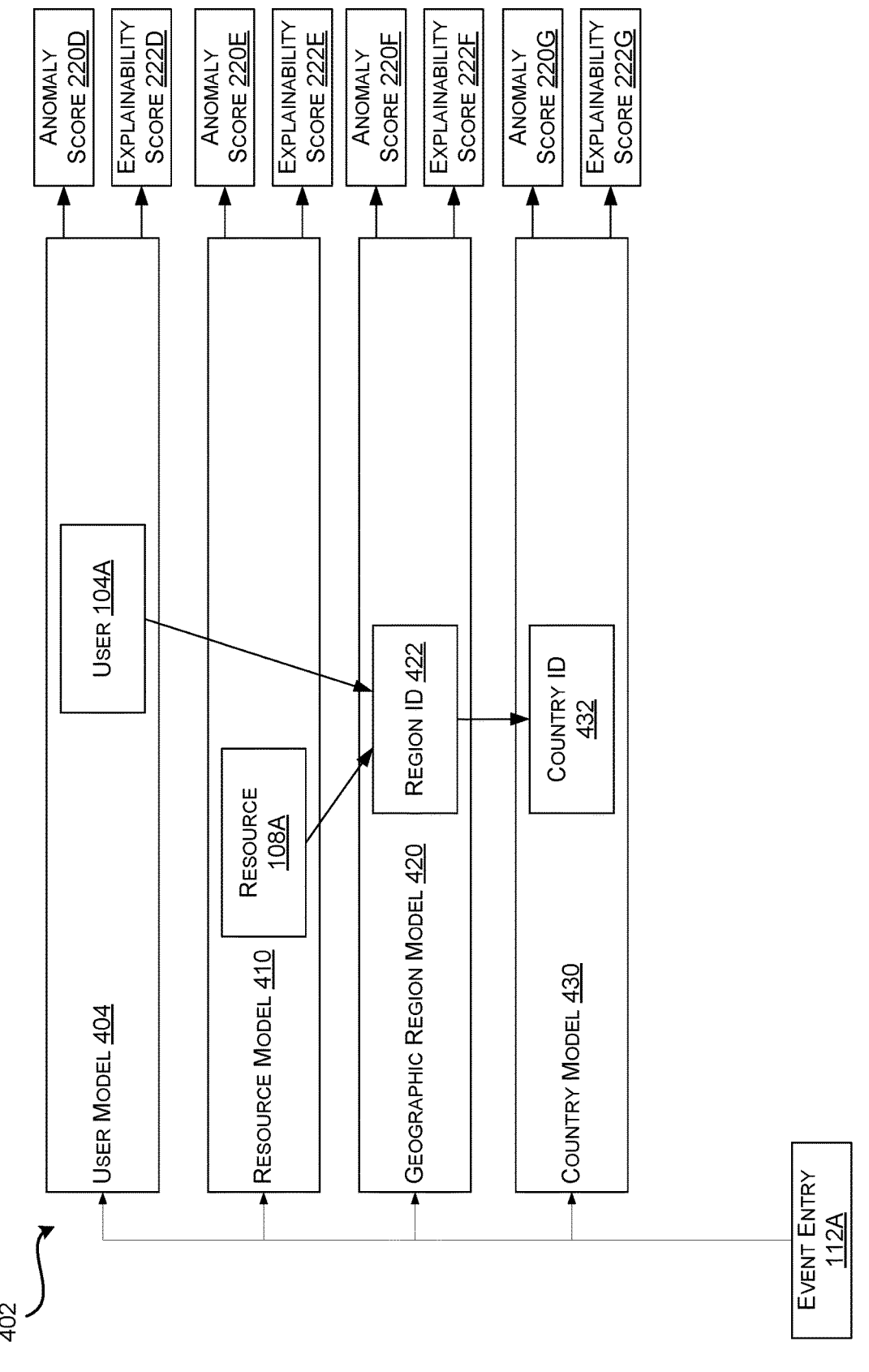
FIG. 4 illustrates a cloud event being processed by models of each level of a geographic hierarchy.

FIG. 4 illustrates a event entry 112A being processed by models of each level of a geographic hierarchy. Similar to the hierarchy 302 depicted in FIG. 3, FIG. 4 depicts a hierarchy 402 of user 104A, resource 108A, region identifier 422, and country identifier 432. User model 404 is trained to generate anomaly score 220D and explainability score 222D, resource model 410 is trained to generate anomaly score 220E and explainability score 222E, geographic region model 420 is trained to generate anomaly score 220F and explainability score 222F, and country model 430 is trained to generate anomaly score 220G and explainability score 222G. By providing event entry 112A to each of these models to infer the corresponding anomaly scores and explainability scores, a more accurate determination can be made whether the operation referenced in event entry 112A is anomalous and therefore likely to be made by a compromised user account.

Figure 5:
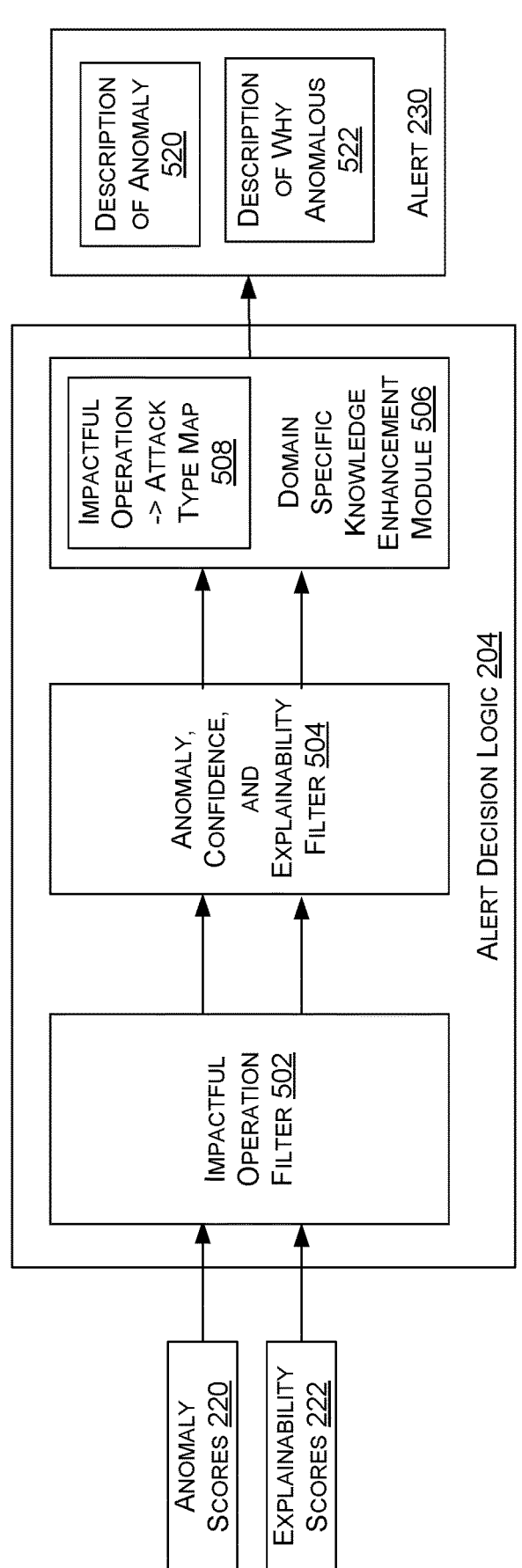
FIG. 5 illustrates how anomaly scores and explainability scores are used to generate a rich, meaningful alert.

FIG. 5 illustrates how anomaly scores 220 and explainability scores 222 are used to generate a rich, meaningful alert 230. As illustrated in conjunction with FIGS. 3-4, machine learning models trained on cloud events generated by hierarchical groups of users are used to infer anomaly scores 220 and explainability scores 222 for a particular event. These scores are then filtered before being augmented with domain specific knowledge used when generating alert 230.

For example, impactful operation filter 502 removes from consideration any operation 132 that has been predefined by a security researcher to be benign. For example, an operation that labels cloud resources may be determined to be anomalous based on the anomaly score 220 and corresponding confidence level 224, but deemed harmless by it's nature as an operation that merely names something. In other configurations, impactful operation filter 502 refers to a list of operations that are most interesting—e.g. that have the most impact—as determined by security researchers. Examples of interesting operations are running a command on a virtual machine, changing security settings—e.g. changing the settings about which operations are considered impactful, or installation of a script.

Additionally, or alternatively, anomaly scores 220 and explainability scores 222 are processed by anomaly, confidence, and explainability filter 504. This filter culls any operations that have anomaly scores below a defined threshold value. Various combinations of thresholds for anomaly scores, confidence scores, and explainability scores are similarly contemplated as thresholds for determining when and when not to consider a cloud event as a candidate for an alert 230.

If a cloud event is determined to be impactful by impactful operation filter 502, and if the anomaly, confidence, and explainability scores surpass any predefined thresholds applied by filter 504, then alert decision logic 204 will generate an alert 230 that includes a description of the anomalous operation 520.

However, in order to convey to customers why the operation 132 is anomalous, domain specific knowledge enhancement module 506 retrieves external knowledge related to operation 132. For example, a pre-defined map 508 may associate impactful operations with attack types. For example, if an anomalous operation uploads a script file to a virtual machine and executes it, the impactful operation to attack type map 508 may indicate that this operation allows arbitrary code execution. In this way, instead of saying 'we found an anomalous operation that was performed on your behalf', alert 230 can indicate what the anomalous operation can lead to. E.g. "We detected some activity in your account that, in later stages, can cause execution of malicious code."

Another type of external knowledge that can be referenced when generating alert 230 is a categorization of operations into "intent buckets". Intent in this context refers to the intent of a hacker that has compromised a user account, and that has performed an operation illicitly. Examples of "intent buckets" include 1) Code execution, 2) Evade defenses, 3) Establish persistence, 4) Attack other resources. By referring to which "intent bucket" an operation falls into, the message of alert 230 can be augmented to indicate what the hacker may be up to.

Once the description of the anomaly 520 and the description of why the operation was determined to be anomalous 522 are available they may be combined as part of alert 230 and sent to interested parties for review.

FIG. 6 is a flow diagram showing aspects of a routine for the disclosed techniques. Routine 600 begins at step 602, where parameters 114-117 of an operation 132 are received.

Routine 600 then proceeds to step 604, where one or more hierarchies 118 of groups of users are identified that include the user 104.

The routine then proceeds to step 606, the received parameters are provided to machine learning models that correspond to the groups of users.

The routine then proceeds to step 608, where an anomaly score 220, a confidence score 224, and an explainability score 222 are received from the machine learning models.

The routine then proceeds to step 610, where a determination is made that operation 132 is anomalous based on the anomaly scores 220 and the confidence scores 224.

The routine then proceeds to step 612, where a description as to why the operation 132 was identified as anomalous is generated based on the explainability scores 222.

The routine then proceeds to step 614, where an alert 230 is generated that includes the description of the anomalous operation 132 and the description of why the operation 132 was identified as anomalous.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 7:
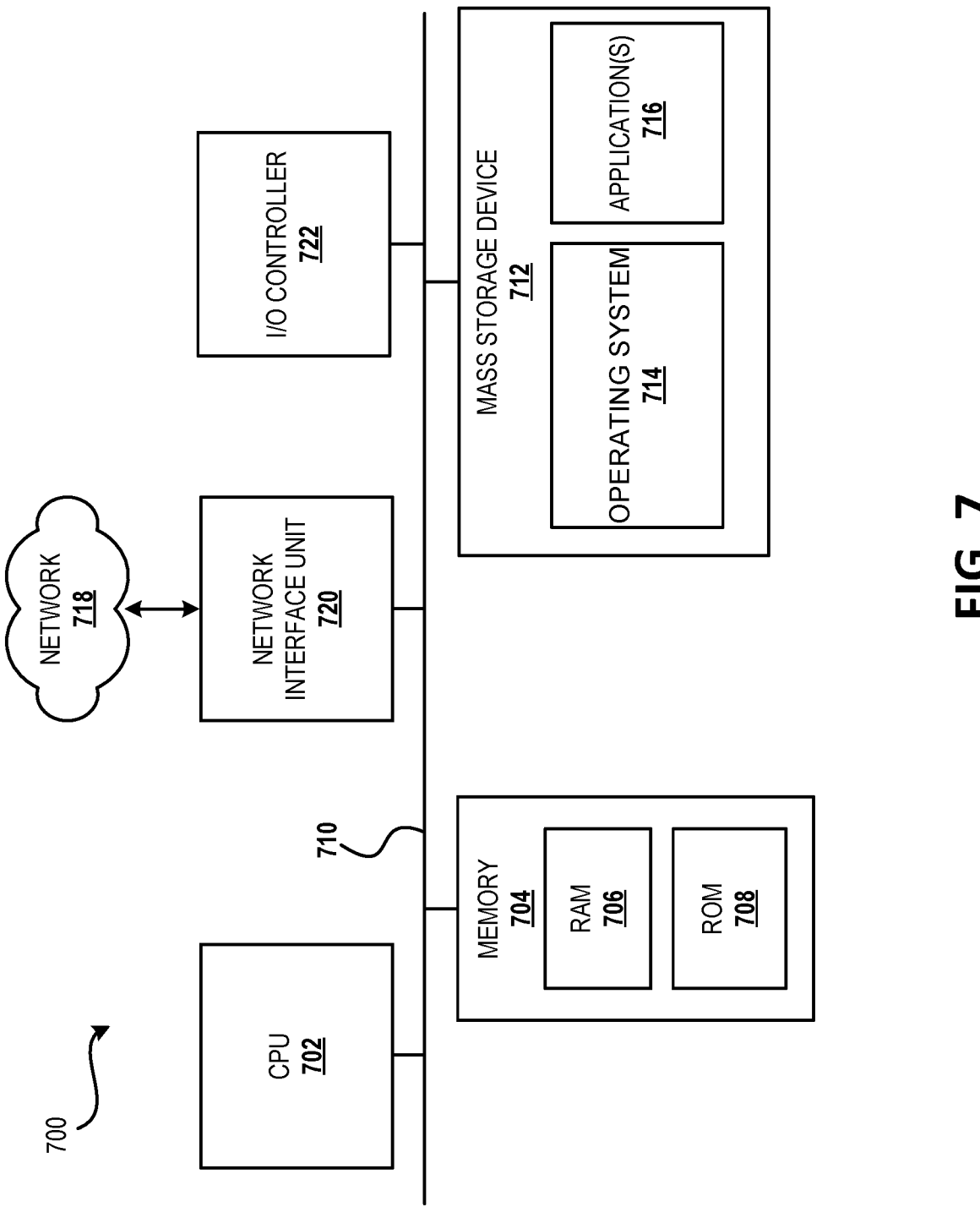
FIG. 7 is a computer architecture diagram illustrating an illustrative computer hardware and software architecture for a computing system capable of implementing aspects of the techniques and technologies presented herein.

Although FIG. 7 refers to the components depicted in the present application, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules.

FIG. 7 shows additional details of an example computer architecture 700 for a device, such as computing device 101, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716 (e.g., models 202 or alert decision logic 204), and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EE-PROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 718. The computer architecture 700 may connect to the network 718 through a network interface unit 720 connected to the bus 710. The computer architecture 700 also may include an input/output controller 722 for receiving and processing input from a number of other devices, including a keyboard, mouse, touch, or electronic stylus or pen. Similarly, the input/output controller 722 may provide output to a display screen, speaker, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
storing records of operations of a plurality of users;
organizing the plurality of users into a hierarchy of groups of users, wherein users of a lower-level group of users of the hierarchy of groups of users are also included in a higher-level group of users of the hierarchy of groups of users, and wherein the higher level group of users includes a set of users that are not in the lower-level group of users;
training a first machine learning model to generate anomaly scores from parameters of operations performed by the lower-level group of users;
training a second machine learning model to generate anomaly scores from parameters of operations performed by the higher-level group of users;
receiving a request to perform an operation from a user, wherein the user is included in the lower-level group of users and the higher-level group of users;
providing a parameter of the requested operation to the first machine learning model and the second machine learning model;
receiving a first anomaly score from the first machine learning model, wherein the first anomaly score exceeds a first anomaly score threshold;
receiving a second anomaly score from the second machine learning model, wherein the second anomaly score does not exceed a second anomaly score threshold;
determining that the requested operation is anomalous based on the first anomaly score exceeding the first anomaly score threshold and the second anomaly score not exceeding the second anomaly score threshold; and
not allowing the requested operation to be performed even though it was deemed not anomalous for the higher-level group of users.

2. The method of claim 1, further comprising:
performing a security countermeasure to mitigate a security threat indicated by the anomalous operation.

3. The method of claim 1, wherein determining that the operation is anomalous is based in part on a determination that fewer than a threshold number or percentage of machine learning models associated with groups of the hierarchy of groups that the user is a part of indicate that the operation is non-anomalous.

4. The method of claim 1, further comprising:
receiving, from the second machine learning model, an explainability score of the parameter;
generating a description of why the operation was identified as anomalous based on the explainability score.

5. The method of claim 1, wherein individual machine learning models generate anomaly scores indicating anomalous behavior when historical interaction data associated with the user indicates a frequency of performing the operation is beneath a defined threshold.

6. A device comprising:

one or more processors; and a computer-readable storage medium having encoded thereon computer-executable instructions that cause the one or more processors to:

store records of operations of a plurality of users;

organize the plurality of users into a hierarchy of groups of users, wherein users of a lower-level group of users of the hierarchy of groups of users are also included in a higher-level group of users of the hierarchy of groups of users, and wherein the higher-level group of users includes a set of users that are not in the lower-level group of users;

train a first machine learning model to generate anomaly scores from parameters of operations performed by the lower-level group of users;

train a second machine learning model to generate anomaly scores from parameters of operations performed by the higher-level group of users;

receive a request to perform an operation from a user, wherein the user is included in the lower-level group of users and the higher-level group of users;

provide a parameter of the requested operation to the first machine learning model and the second machine learning model;

receive a first anomaly score from the first machine learning model, wherein the first anomaly score does not exceed a first anomaly score threshold;

receive a second anomaly score from the second machine learning model, wherein the second anomaly score exceeds a second anomaly score threshold;

determine that the requested operation is not anomalous based on the first anomaly score not exceeding the first anomaly score threshold and the second anomaly score exceeding the second anomaly score threshold; and allow the requested operation to be performed even though it was deemed anomalous for the higher-level group of users.

7. The device of claim 6, wherein the instructions further cause the one or more processors to determine that the operation is not anomalous based on inclusion in a list of benign operations.

8. The device of claim 6, wherein the instructions further cause the one or more processors to:

receive, from the first and second machine learning models, explainability scores; and generate a description of why the operation was identified as not anomalous based on the explainability scores.

9. The device of claim 6, wherein the hierarchy of groups of users comprises a first hierarchy of groups of users and is based on a geographic hierarchy, wherein a second hierarchy of groups of users is based on a resource allocation scheme of the cloud service, and wherein the determination that the operation is not anomalous is additionally based on anomaly scores inferred from different machine learning models associated with groups of the second hierarchy of groups of users.

10. A non-transitory computer-readable storage medium storing instructions that, when executed by a processor, cause the processor to:

store records of operations of a plurality of users;

organize the plurality of users into a hierarchy of groups of users, wherein users of a lower-level group of users of the hierarchy of groups of users are also included in a higher-level group of users of the hierarchy of groups of users, and wherein the higher-level group of users includes a set of users that are not in the lower-level group of users;

train a first machine learning model to generate anomaly scores from parameters of operations performed by the lower-level group of users;

train a second machine learning model to generate anomaly scores from parameters of operations performed by the higher-level group of users;

receive a request to perform an operation from a user, wherein the user is included in the lower-level group of users and the higher-level group of users;

provide a parameter of the requested operation to the first machine learning model and the second machine learning model;

receive, from the first machine learning model, a first anomaly score, wherein the first anomaly score exceeds a first anomaly score threshold;

receive a second anomaly score from the second machine learning model, wherein the second anomaly score does not exceed a second anomaly score threshold;

determine that the requested operation is anomalous based on the second anomaly score not exceeding the second anomaly score threshold and the first anomaly score exceeding the first anomaly score threshold; and not allow the requested operation to be performed even though it was deemed not anomalous for the higher-level group of users.

11. The non-transitory computer-readable storage medium of claim 10, wherein the hierarchy of groups of users includes an intermediate level, and wherein an anomaly score of a group of users at the intermediate level is used to determine whether the requested operation is anomalous.

12. The non-transitory computer-readable storage medium of claim 10, wherein the hierarchy of groups of users is based on a resource allocation scheme of a cloud service, wherein the higher-level group of users comprises users that are part of a tenant of the cloud service, and wherein the two or more groups of users from the lower-level are each associated with subscriptions to the cloud service.

13. The non-transitory computer-readable storage medium of claim 10, wherein an individual anomaly score associated with the higher-level group of users is generated by providing the second machine learning model with properties of an operation performed by the user.

14. The non-transitory computer-readable storage medium of claim 10, wherein the lower-level group of users is one of a plurality of groups of users in a lower level of the hierarchy of groups of users.

15. The non-transitory computer-readable storage medium of claim 10, wherein the user is included in the higher-level group of users and one of the plurality of groups of users in the lower level.

16. The non-transitory computer-readable storage medium of claim 10, wherein the instructions further cause the processor to generate an alert comprising a description of the anomalous operation augmented with external knowledge about the operation.

17. The non-transitory computer-readable storage medium of claim 16, wherein the external knowledge comprises an indication of an intention commonly held by hackers when performing the anomalous operation or an indication of a potential consequence if the anomalous operation is part of an attack performed by hackers.

18. The non-transitory computer-readable storage medium of claim 10, wherein the determination that the operation is anomalous is performed using a rule-based algorithm applied to the scores received from the first and second machine learning models.

\* \* \* \* \*